UNITED STATES PATENT OFFICE.

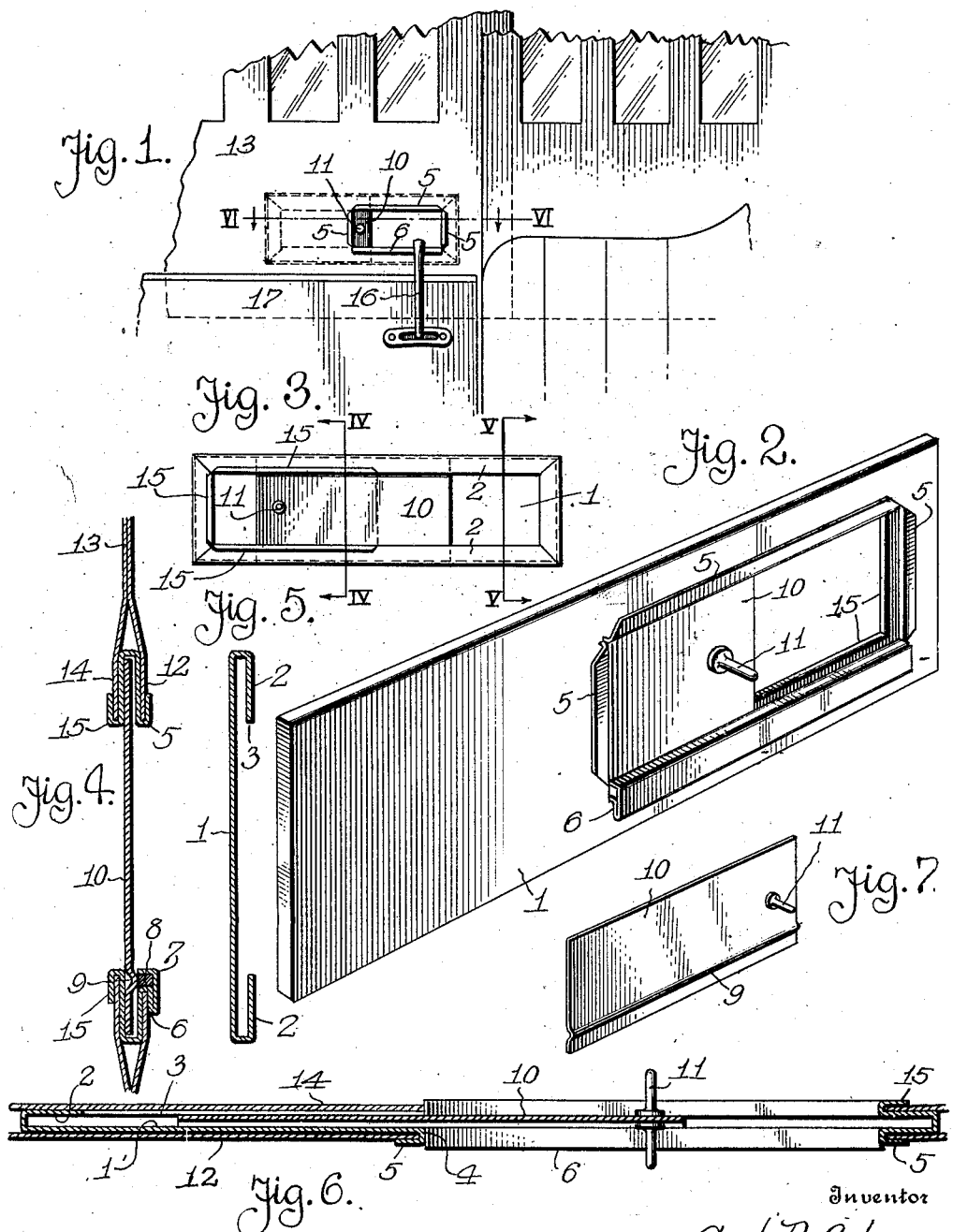

CARL D. COKER, OF DETROIT, MICHIGAN.

SLIDE-CLOSURE.

1,313,580.  Specification of Letters Patent.  Patented Aug. 19, 1919.

Application filed February 28, 1919. Serial No. 279,698.

*To all whom it may concern:*

Be it known that I, CARL D. COKER, a citizen of the United States of America, residing at Detroit, in the county of Wayne and State of Michigan, have invented certain new and useful Improvements in Slide-Closures, of which the following is a specification, reference being had therein to the accompanying drawings.

Automobile curtains and side panels now in use to provide an inclosure for the upper portion of an automobile are provided with openings, adjacent the automobile door latches so that the hand may be inserted to operate the door latch. Sometimes such openings are provided with flaps adapted to exclude air and other elements, but on account of the openings being almost constantly used, the flaps become inactive for the purposes intended, consequently cold air enters the automobile body much to the discomfiture of the occupants thereof.

The primary object of my invention is to provide a novel slide closure that may be readily embodied in an automobile curtain or panel to provide a hand opening when necessary, the opening being normally closed by a slide which positively, excludes the elements, yet permits of easy access being had to an automobile door latch or other operating member, without any danger of the curtain or panel being worn or injured by constant use.

A further object of my invention is to provide a slide closure which includes a novel casing and means carried thereby for preventing the slide from rattling, said means taking up lost motion and at the same time excluding elements that might retard the operation of the slide.

The above and other objects are attained by a simple, durable and inexpensive construction that will be hereinafter specifically described and then claimed, and reference will now be had to the drawing, wherein—

Figure 1 is a side elevation of a portion of an automobile body, and curtain, showing the latter provided with a slide closure in accordance with my invention;

Fig. 2 is an enlarged perspective view of the slide closure;

Fig. 3 a side elevation of the same;

Fig. 4 is an enlarged cross-sectional view taken on the line IV—IV of Fig. 3;

Fig. 5 is a similar view taken on the line V—V of Fig. 3;

Fig. 6 is an enlarged longitudinal sectional view, taken on the line VI—VI of Fig. 1;

Fig. 7 is a perspective view of the detached slide.

The slide closure comprises an oblong comparatively flat casing having an inner wall 1 and an outer wall 2, said outer wall having an oblong opening 3 approximately the length and depth of said casing, while the inner wall 1 has an opening simply at one end thereof, said opening being designated 4 and corresponding in depth to the opening 3. The marginal edges of the opening 4 are provided with outturned flanges 5 and 6, said flanges being bent into parallelism with the outer side of the wall 1 and the flanges 5 surrounding the upper and end edges of the opening 4, while the flange 6 is at the lower longitudinal edge of the opening 4 and is again bent to extend into the opening 4 and provide a strip holder 7 for a resilient weather or anti-rattling strip 8, best shown in Figs. 2 and 4. The strip 8 may be in the form of a piece of rubber and is adapted to engage a pressed out longitudinal rib 9 contiguous to the lower longitudinal edge of a flat slide 10, said slide being shiftable between the walls 1 and 2 to coöperate with the wall 1 in closing the opening 4 thereof. To facilitate shifting said slide, one end thereof is provided with hand pieces 11 protruding from both sides of the slide so that it may be shifted from either side of said casing.

The flanges 5 and 6 of the wall 1 will operate in holding the marginal edges of one-ply 12 of an automobile curtain or panel 13 and flanges 15 of the wall 2 coöperate in maintaining another ply 14 of said curtain in engagement with the closure casing. The flanges 15 are at three sides of the opening 3 at one end thereof as best shown in Fig. 3, and in consequence of this construction the curtain ply 14 will overlie and close the opening 3 of the wall 2 and close a portion of said opening, the remaining portion adapted to be closed by the slide 10.

As shown in Fig. 1, the curtain 13 is provided with an opening adjacent the latch handle or knob 16 of an automobile body door 17 and with the slide closure mounted in the opening of the curtain 13, the slide 10 can be shifted to close the opening and exclude the elements, or shifted to an open position so that a hand can be inserted through the closure casing to operate the latch handle or knob 16.

For a single ply curtain, it is only necessary to provide holding flanges at one side of the casing.

It is thought that the utility of the slide closure will be apparent without further description, and while in the drawing there is illustrated a preferred embodiment of my invention, it is to be understood that the structural elements are susceptible to such variations and modifications as fall within the scope of the appended claims.

What I claim is:—

1. A slide closure for automobile curtains comprising a casing adapted to be mounted in an opening in an automobile curtain, said casing having an opening; a slide shiftable in said casing adapted to close the opening thereof, flanges at the marginal edges of the casing opening and adapted to hold the marginal edges of the automobile curtain opening, and a strip carried by one of the flanges of said casing adapted to bear against said slide and prevent rattling thereof in said casing.

2. A slide closure for automobile curtains comprising a casing adapted to be mounted in an opening provided therefor in an automobile curtain, said casing having the side walls thereof provided with openings, with one of said openings of a greater area than the other opening, curtain holding flanges at the marginal edges of the casing openings, a shiftable slide in said casing adapted to close the openings thereof, and means carried by one of said flanges and engaging said slide to prevent rattling thereof.

3. A slide closure of the character described comprising a casing having side walls thereof provided with openings, a shiftable slide in said casing, means carried by said casing and engaging said slide adapted to prevent rattling of said slide in said casing, and means carried by said casing adapted to facilitate the attachment of said casing to an automobile curtain.

In testimony whereof I affix my signature in the presence of two witnesses.

CARL D. COKER.

Witnesses:
KARL H. BUTLER,
LEWIS E. FLEMDUS.